United States Patent [19]

Abramovici

[11] Patent Number: 5,145,619
[45] Date of Patent: Sep. 8, 1992

[54] COMBUSTION-SYNTHESIS PROCESS FOR MAKING FRICTION MATERIALS

[75] Inventor: Rudolf Abramovici, Depew, N.Y.

[73] Assignee: Benchmark Structural Ceramics Corporation, Amherst, N.Y.

[21] Appl. No.: 499,169

[22] Filed: Mar. 26, 1990

[51] Int. Cl.$^5$ ............................................. C04B 33/32
[52] U.S. Cl. ........................................ 264/60; 264/80
[58] Field of Search ................................... 264/60, 80

[56] References Cited

U.S. PATENT DOCUMENTS 4,217,948  8/1980  Merzhanov et al. ................. 264/60
4,642,218  2/1987  Rice ....................................... 264/80
4,889,745 12/1989  Sata ....................................... 264/56
4,902,457  2/1990  Wada et al. ........................... 264/63

*Primary Examiner*—James Derrington
*Attorney, Agent, or Firm*—Howard J. Greenwald

[57] ABSTRACT

A process in which a mixture containing aluminum, iron, and one or more metallic oxides is used. This mixture is formed into a shaped body, the shaped body is preheated to a temperature of from about 50 to about 400 degrees centigrade, and the preheated material is then ignited, causing a highly-exothermic reaction to occur. During this reaction, aluminum reacts with metal oxide(s) and the green body is densified.

20 Claims, No Drawings

COMBUSTION-SYNTHESIS PROCESS FOR MAKING FRICTION MATERIALS

FIELD OF THE INVENTION

A one-step, self-propagating, aluminothermic process for producing a shaped friction material.

BACKGROUND OF THE PRIOR ART

Friction materials are well known to those skilled in the art. They find extensive used as brake linings, clutch facings, and the like. See, for example, U.S. Pat. Nos. 2,470,269 of Schaefer, 2,848,795 of Lowey, 3,019,514 of Bickelhaupt et al., 3,033,672 of Rejdak, 3,835,118 of Rhee, 4,391,641 of Lloyd, and 4,438,004 of Myers. The disclosure of each of these patents is hereby incorporated by reference into this specification.

The prior art processes for preparing friction materials generally involve the separate steps of forming a mixture of materials into a green body and then sintering the green body at elevated temperatures. These processes generally require expensive materials and the provision of heat for extended periods of time to effect the sintering. Furthermore, the prior art friction materials had friction properties which were not always satisfactory and/or which often degraded readily with temperature.

It is an object of this invention to provide a process for making friction materials which utilizes relatively inexpensive raw materials.

It is another object of this invention to provide an exothermic process for the preparation of friction materials.

It is another object of this invention to provide a one-step process in which the relatively inexpensive raw materials are formed and densified in situ to produce the shaped final product.

It is yet another object of this invention to provide a process for preparing a friction material with improved friction properties, such as improved friction coefficients, better self-lubrication, and increased wear resistance.

It is yet another object of this invention to provide a process for preparing a friction material with durable friction properties which do not degrade readily with heat.

SUMMARY OF THE INVENTION

In accordance with this invention, there is provided a process in which a mixture containing aluminum, iron, and one or more metallic oxides is used. This mixture is then formed into a shaped body, the shaped body is preheated to a temperature of from about 50 to about 400 degrees centigrade, and the preheated material is then ignited, causing a highly-exothermic reaction to occur. During this reaction, aluminum reacts with metal oxide(s) and the green body is densified.

DESCRIPTION OF THE PREFERRED EMBODIMENTS

In the first step of the process of this invention, a mixture of aluminum, iron, and one or more metallic oxides is provided.

The mixture used in the first step of the process of this invention contains from about 5 to about 35 weight percent of aluminum, by total weight of aluminum and iron in the mixture. It is preferred that the mixture contain from about 5 to about 25 weight percent of aluminum. In an even more preferred embodiment, the mixture contains from about 5 to about 20 weight percent of aluminum.

In one preferred embodiment, the aluminum used has a particle size distribution such that substantially all of its particles are from about 5 to about 30 microns in diameter or equivalent diameter. As is known to those skilled in the art, the term "equivalent diameter" refers to the largest dimension of the particle which, in the case of spherical particles, is the diameter. In a more preferred embodiment, at least about 90 weight percent all of the aluminum particles have an equivalent diameter of from about 9 to about 17 microns.

The aluminum used in the process preferably should contain at least about 91 percent of aluminum and not more than 1.0 percent of oxygen. Thus, by way of illustration, one aluminum which may be used in applicant's process is aluminum metallic powder, catalog number UN-1396, grade 3100, obtained from the Alcan-Toyo America, Inc. of Lockport, Ill. This material contains 95 percent aluminum.

The mixture used in the first step of the process also contains from about 65 to about 95 percent of iron powder, by combined weight of aluminum and iron in the mixture. In one embodiment, it is preferred to use iron powder which has a particle size distribution such that substantially all of its particles pass through a 325 mesh screen and, thus, are smaller than 53 microns. It is preferred that iron used be at least 98 percent pure and contain less than about 1.0 percent of oxygen. Thus, e.g., one may use an iron metallic powder reduced reagent identified as reagent number 11035 by the Spectrum Chemical Company; this reagent is −325 mesh and contains 98 percent of iron.

The use of the specified amounts of iron in applicant's process produces a shaped, sintered body with excellent wear resistance and friction coefficient properties.

In addition to the iron and aluminum, the mixture used in the first step of the process also must contain at least one metallic oxide selected from the group consisting of ferric oxide, copper oxide, chromium oxide, nickel oxide, molybdenum oxide, cobalt oxide, manganese oxide, lead oxide, tin oxide, bismuth oxide, silica, alumina, mixtures thereof, and the like. It is preferred that the mixture contain at least two of such oxides. In one embodiment, the mixture contains at least three of such oxides.

In one embodiment, it is preferred that, when the mixture contains cobalt oxide and/or manganese oxide, that such oxide(s) be present in a concentration of from about 3 to about 8 percent.

In general, the mixture contains from about 20 to about 80 weight percent of said oxide(s), by weight of aluminum, iron, and oxide(s). It is preferred that the mixture contain from about 15 to about 60 weight percent of said oxide(s). In one embodiment, the mixture contains from about 15 to about 40 weight percent of said oxide(s).

The oxide(s) used preferably have a particle size distribution such that substantially all of the oxide particles are smaller than 53 microns. It is more preferred that at least 90 weight percent of the oxide particles be smaller than about 44 microns. It is even more preferred that at least about 90 weight percent of the oxide particles be smaller than 30 microns.

In general, the combined weight of aluminum and iron in the mixture is from about 20 to about 80 percent of the combined weight of aluminum, iron, and metal oxide(s) in the mixture.

The mixture used in the first step of the process is comprised of sufficient amounts of said iron, said aluminum, and said oxide(s) such that at least about 80 weight percent of the mixture comprises said iron, said aluminum, and said oxide(s). In a more preferred embodiment, at least about 90 weight percent of the mixture is comprised of said iron, said aluminum, and said oxide(s).

In one embodiment, the mixture contains up to about 10 weight percent, by total weight of mixture, of aluminum oxide. In this embodiment, it is preferred that the particle size of the alumina must be such that substantially all of the alumina particles are smaller than 16 microns.

In addition to the other reactants specified above, the mixture also may contain from about 0 to about 10 weight percent, by total weight of mixture, of lead. The particle size of any lead so used should be such that all of the lead particles are smaller than 53 microns.

In one embodiment, the iron, aluminum, and metallic oxide components are all mixed together at the same to provide the desired composition used in the process. In another preferred process, aluminum and metallic oxide(s) components are first intimately mixed together, and then this mixture of aluminum and metallic oxide(s) is then mixed with the iron. In yet another preferred embodiment, where a mixture of metal oxides is used, such metal oxides are first mixed with each other, the mixture of oxides thus produced is then mixed with the aluminum, and the mixture of aluminum and metal oxides is then mixed with the iron. In general, these mixing processes are continued until substantially homogeneous mixtures are obtained.

In the second step of applicant's process, the mixture provided in the first step is formed into a green body. Any means well known to those skilled in the art may be used to form the green body.

By way of illustration, one may form the green body by pressing the mixture in a metal die, by isostatic pressing, by extrusion, by molding, etc. These and other techniques for forming a ceramic green body are well known to those skilled in the art and are described, e.g., in Andre P. Galliath's "Ceramic Manufacturing Technology: Forming, Drying, Firing" (The American Ceramic Society, Westerville, Ohio, 1987), the disclosure of which is hereby incorporated by reference into this specification.

Pressing is one preferred means for forming the ceramic green body. As is known to those skilled in the art, pressing is the simultaneous compaction and shaping of a powder or granular material confined in a rigid die or a flexible mold. See, e.g., pages 329-332 of James S. Reed's "Introduction to the Principles of Ceramic Processing," (John Wiley and Sons, New York, 1988) and pages 559-561 of S. Kalpakjian's "Manufacturing Engineering and Technology," (Addison-Wesley Publishing Company, Reading, Mass., 1989). The disclosure of these books is hereby incorporated by reference into this specification.

One may use any of the presses well known to those skilled in the art. Thus, by way of illustration and not limitation, one may use the "Laboratory Series Powder Compaction Press", 60 ton model, available from Gasbarre Products, Inc. of DuBois, Pa.

In one preferred embodiment, it is preferred to conduct the pressing in two stages. In the first stage, the material is pressed at a pressure of from about 30 to about 40 percent of the final pressing pressure in order to initially compact the material into the die and to reduce its air content. Once the pressure on the material in the die has reached 30-40 percent of the final pressing pressure, the pressure is released. Thereafter, in a second stage, the pressure is reapplied until it reaches 100% of the pressing pressure.

In this preferred embodiment, in general, the final pressing pressure used will range from about 700 to about 1,500 kilograms per square centimeter. Thus, in the first step of the preferred pressing process, the pressure will be raised to from about 210 to about 600 kilograms per square centimeter; then it will be released to about 0 kilograms per square centimeter; and then it will be raised from 0 to from about 700 to about 1,500 kilograms per square centimeter.

In applicant's process, no additional binder or lubricant is required in the forming step. Without wishing to be bound to any particular theory, applicant believes that flake-like aluminum particles act as binder during the forming.

Once the green body has been pressed in the die, or otherwise formed by another method, it is preheated prior to the time it is ignited.

In general, the green body is preheated to a temperature of from about 50 to about 400 degrees centigrade and, preferably, from about 100 to about 300 degrees centigrade. It is preferred to preheat the green body in such a manner that all of its surfaces are at substantially the same temperature prior to ignition. This substantially uniform temperature profile may be obtained by various means known to those in the art.

The precise preheating temperature which should be used for any particular composition will vary with that composition and the density of the green body made from it. By trying various temperatures within the preheating range, one may determine which temperature gives the best product. In general, a preheating temperature lower than ideal will produce a product with laminations, thereby reducing its strength. A preheating temperature above the ideal will produce a product in which droplets of molten iron tend to leave the system, leaving voids in the product.

Thus, one may conduct the preheating in a crucible having the shape of the green body. This crucible may be made out of lightweight, thermally insulative refractory brick. The green body is placed into the crucible and preferably is substantially encapsulated by the crucible; in general, the dimensions of the crucible cavity are from about 5 to about 10 percent greater than the dimensions of the green body, thus assuring a reasonably tight fit. Once the green body has been placed into the crucible cavity, the assembly is then preheated. Because of the close fit of the green body in the crucible cavity, there is very little heat gradient across the green body.

In another embodiment, the green body is placed into the aforementioned crucible cavity and then its exposed top is covered by a lid of insulative material, preferably made from the same material as the crucible is made of.

It is preferred, when using such a crucible and/or lid to preheat the green body, to coat the inside surfaces of the crucible and/or lid with a boron nitride spray to avoid sticking. Thus, one may use "COMBAT" Boron Nitride Aerosol Spray (sold by the Standard Oil Engineered Materials Company of Niagara Falls, N.Y.) for this purpose. Other sprays which will serve the same purpose are well known to those skilled in the art.

Regardless of which method is used, the preheating should be conducted so that each face of the green body is heated to substantially the same temperature, within the range of from about 50 to about 400 degrees centigrade.

As soon as the preheated body has reached the desired uniform temperature, it may be ignited by conventional means. Thus, one may direct the flame from an oxyacetylene torch onto the sample, thereby igniting it.

It is preferred to contact a certain minimum mass of the green body with the heat source. In general, one should contact from at least about 0.2 to about 1.0 cubic centimeters of the volume of the green body with the heat source to ignite it. One may contact more volume than this with the heat source. However, inasmuch as the properties of the material which is contacted with the heat source often differ from the properties of the remainder of the body, it is preferred to contact as small a volume of the body as possible with the heat source for ignition. Thus, it is preferred that only a minor amount of the preheated green body be contacted with the ignition source.

In one preferred embodiment, the ignition source is at a temperature of at least from about 700 to about 1,000 degrees centigrade. In another preferred embodiment, the preheated green body is ignited by being exposed to a source of microwave energy.

Once ignition occurs, a highly-exothermic, self-propagating reaction occurs in and on the green body, simultaneously synthesizing and densifying the body. During the combustion, aluminum is reacted with metal oxide(s), and the green body becomes densified.

The combusted and densified body is allowed to cool, preferably in the same crucible. Thereafter, it is removed from the crucible.

The friction material made by the process of this invention has superior wear resistance properties. As is known to those skilled in the art, wear resistance, also often referred to as abrasion resistance, is a measure of the ability of a material to resist wear by friction. Samples are evaluated based upon loss of weight and change in friction surface aspects.

The following examples are presented to illustrate the claimed invention but are not to be deemed limitative thereof. Unless otherwise specified, all parts are by weight, and all temperatures are in degrees centigrade.

EXAMPLE 1

16.81 grams of copper oxide (reagent number 12229, 1990/1991 Alfa catalog, Johnson Matthey, Ward Hill, Mass.) containing 97 percent of copper [II] oxide, 4.04 grams of tin oxide (reagent number 10891, 1990/1991 Alfa catalog) containing 99 percent of tin [IV] oxide, and 6.34 grams of silica containing 98.6 percent of silica and having a specific surface area of 6.3 square meters per gram were mixed in a unitized jar mill (model 765AVM, U.S. Stoneware, Mahwah, N.J.) equipped with a 1.5 liter Roalox Alumina-Fortified Grinding Jar (model) number 774, U.S. Stoneware) for 5.0 hours. Thereafter, 8.84 grams of aluminum (reagent number UN-1396, grade 3100, Alcan-Toyo American, Inc., Lockport, Ill.) were added to the mixture, and mixing was resumed for another 2.0 hours. Thereafter, 66.33 grams of iron powder (reagent number 11035, Spectrum Chemical Manufacturing Company, Gardena, Calif.) were added to the mill, and mixing was then continued for another 2.0 hours.

The mixture was then discharged to a Carver press (Carver Laboratory Press 13-872, page 897, Fischer '88 Catalog, Fischer Scientific Company, Pittsburgh, Pa.) equipped with a stainless steel die with a cavity diameter of 1.25 inches and a thickness of 0.25 inches. A pressure of 454 kilograms per square centimeter was initially applied to the material in the die, and then the pressure was released. Thereafter, a pressure of 1,134 1134 kilograms per square centimeter was applied to form the green body.

Each disc produced was then placed into a cavity cut into a fireclay refractory brick; the cavity was disc-shaped, with a diameter of 1.35 inches and a depth of 0.25 inches.

The brick/disc assembly was then placed into a 85M Laboratory Box Furnace (purchased from the J. M. Ney Company, Bloomfield, Conn.) furnace and heated to a temperature of 250 degrees centigrade for 20 minutes. After this period of time, an oxyacetylene torch flame was directed towards the sample, and ignition occurred. The disc of material in the furnace was synthesized and densified by the self-propagating, highly exothermic reaction which occurred.

EXAMPLE 2

The procedure of Example 1 was substantially followed, with the exception that 71.43 grams of iron, 5.82 grams of aluminum, and 25.23 grams of copper oxide were used as the reactants. The initial pressure used was 460 kilograms per square centimeter, the final pressure used was 900 kilograms per square centimeter, and the green body was preheated to 150 degrees centigrade for 20 minutes prior to ignition.

EXAMPLE 3

The procedure of Example 1 was substantially followed, with the exception that 66.33 grams of iron, 7.20 grams of aluminum, 3.73 grams of chromium oxide, and 25.23 grams of copper oxide were used as the reactants. The initial pressure used was 500 460 kilograms per square centimeter, the final pressure used was 1250 kilograms per square centimeter, and the green body was preheated to 250 degrees centigrade for 20 minutes prior to ignition.

EXAMPLE 4

The procedure of Example 1 was substantially followed, with the exception that 65.07 grams of iron, 8.8 grams of aluminum, and 25.23 grams of copper oxide were used as the reactants. The initial pressure used was 460 kilograms per square centimeter, the final pressure used was 900 kilograms per square centimeter, and the green body was preheated to 150 degrees centigrade for 20 minutes prior to ignition.

EXAMPLE 5

The procedure of Example 1 was substantially followed, with the exception that 63.06 grams of iron, 6.86 grams of aluminum, 3.17 grams of silica, 4.04 grams of tin oxide, and 16.81 grams of copper oxide were used as the reactants. The initial pressure used was 460 kilograms per square centimeter, the final pressure used was 1150 kilograms per square centimeter, and the green body was preheated to 225 degrees centigrade for 20 minutes prior to ignition.

EXAMPLES 6-24

In substantial accordance with the procedure of Example 1, the experiments described in Table 1 were conducted. This table describes the percentages of the various reagents used in these experiments and the preheating temperatures used.

TABLE 1

| Example No. | Fe % | Al % | CuO % | Cr$_2$O$_3$ % | NiO % | MoO$_3$ % | PbO % | SnO$_2$ % | Bi$_2$O$_3$ % | Al$_2$O$_3$ % | Fe$_2$O$_3$ % | SiO$_2$ % | Pb % | Preheating Temperature °C |
|---|---|---|---|---|---|---|---|---|---|---|---|---|---|---|
| 06 | 60.0 | 10.10 | — | — | — | — | — | — | — | — | 29.90 | — | — | 300 |
| 07 | 65.00 | 8.84 | — | — | — | — | — | — | — | — | 26.16 | — | — | 225 |
| 08 | 65.00 | 6.45 | 28.54 | — | — | — | — | — | — | — | — | — | — | 250 |
| 09 | 66.00 | 5.35 | 23.65 | — | — | — | — | — | — | 5.00 | — | — | — | 250 |
| 10 | 65.00 | 5.53 | 24.47 | — | — | — | — | — | — | 5.00 | — | — | — | 250 |
| 11 | 62.00 | 6.03 | 26.91 | — | — | — | — | — | — | 5.00 | — | — | — | 300 |
| 12 | 70.00 | 6.12 | 18.35 | 5.54 | — | — | — | — | — | — | — | — | — | 200 |
| 13 | 65.00 | 6.85 | 24.47 | 3.68 | — | — | — | — | — | — | — | — | — | 250 |
| 14 | 65.00 | 6.96 | 20.39 | 4.43 | 3.22 | — | — | — | — | — | — | — | — | 250 |
| 15 | 60.00 | 9.33 | 7.01 | — | 2.86 | — | — | — | — | — | 20.81 | — | — | 275 |
| 16 | 60.00 | 6.89 | 24.47 | — | — | 3.64 | — | — | — | 5.00 | — | — | — | 275 |
| 17 | 64.20 | 5.90 | 22.43 | — | — | 1.75 | 2.22 | — | — | 3.50 | — | — | — | 225 |
| 18 | 64.00 | 5.47 | 22.59 | — | — | — | 4.44 | — | — | 3.50 | — | — | — | 225 |
| 19 | 70.00 | 6.42 | 16.31 | — | — | 7.27 | — | — | — | — | — | — | — | 200 |
| 20 | 70.00 | 6.46 | 12.23 | — | — | 7.27 | — | 4.04 | — | — | — | — | — | 150 |
| 21 | 70.00 | 5.57 | 20.39 | — | — | — | — | 4.04 | — | — | — | — | — | 150 |
| 22 | 70.00 | 6.52 | 16.31 | — | — | — | — | 4.04 | — | — | — | 3.13 | — | 200 |
| 23 | 60.00 | 6.46 | 26.46 | — | — | — | — | — | 4.48 | 3.00 | — | — | — | 275 |
| 24 | 63.00 | 5.98 | 22.50 | — | — | — | — | — | 8.52 | — | — | — | — | 250 |

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

I claim:

1. A self-propagating, aluminothermic process for producing a friction material, comprising the steps of sequentially:
   (a) providing a composition comprised of a mixture of aluminum, iron, and at least one metal oxide, wherein:
      1. said metal oxide is selected from the group consisting of the oxides of iron, copper, chromium, nickel, molybdenum, cobalt, manganese, lead, tin, silicon, bismuth, aluminum, and mixtures thereof;
      2. at least 80 weight percent of said composition is comprised of said mixture of said aluminum, said iron, and said metal oxide(s);
      3. said aluminum and said iron comprise from about 20 to about 80 weight percent of said mixture;
      4. said metal oxide(s) comprise from about 80 to about 15 weight percent of said mixture;
      5. the weight of said aluminum in said mixture represents from about 5 to about 35 weight percent of the combined weight of aluminum and iron in the mixture; and
      6. the weight of said iron in said mixture represents from about 65 to about 95 weight percent of the combined weight of the aluminum and iron in the mixture;
   (b) forming said composition into a green body;
   (c) preheating said green body to a temperature of from about 50 to about 400 degrees centigrade;
   (d) igniting said preheating green body by contacting it with a heat source at a temperature of at least about 700 degrees centigrade; and
   (e) reacting said aluminum with said metal oxide(s), thereby densifying said green body.

2. The process as recited in claim 1, wherein said metal oxide comprises from about 15 to about 60 weight percent of said composition.

3. The process as recited in claim 2, wherein said mixture is comprised of from about 5 to about 25 weight percent of said aluminum.

4. The process as recited in claim 3, wherein substantially all of the particles of said aluminum are from about 5 to about 30 microns in equivalent diameter.

5. The process as recited in claim 4, wherein substantially all of the particles of said iron are smaller than about 53 microns.

6. The process as recited in claim 5, wherein substantially all of the particles of said metal oxide(s) are smaller than about 53 microns.

7. The process as recited in claim 6, wherein said composition is comprised of at least two metal oxides.

8. The process as recited in claim 7, wherein at least about 90 weight percent of said composition is comprised of said aluminum, said iron, and said metal oxides.

9. The process as recited in claim 1, wherein said metal oxide is alumina.

10. The process as recited in claim 9, wherein substantially all of the particles of said alumina are smaller than 16 microns.

11. The process as recited in claim 1, wherein said composition additionally contains lead.

12. The process as recited in claim 11, wherein substantially all of the particles of said lead are smaller than 53 microns.

13. The process as recited in claim 1, wherein said green body is formed by pressing said composition.

14. The process as recited in claim 13, wherein said composition is pressed at a pressure of from about 700 to about 1,500 kilograms per square centimeter.

15. The process as recited in claim 14, wherein at least about 90 weight percent of said aluminum particles having an equivalent diameter of from about 9 to about 17 microns.

16. The process as recited in claim 15, wherein said composition is comprised of from about 15 to about 40 weight percent of said metal oxides.

17. The process as recited in claim 16, wherein at least about 90 weight percent of said metal oxide particles are smaller than 44 microns.

18. The process as recited in claim 17, wherein at least about 90 weight percent of said metal oxide particles are smaller than 30 microns.

19. The process as recited in claim 18, wherein said composition is comprised of alumina.

20. The process as recited in claim 19, wherein substantially all of said alumina particles are smaller than 16 microns.

* * * * *